(12) United States Patent
Lee

(10) Patent No.: US 6,414,811 B1
(45) Date of Patent: Jul. 2, 2002

(54) METHOD FOR OPTIMIZING THE READ BIAS CURRENT OF A MAGNETO RESISTIVE HEAD

(75) Inventor: Kang-seok Lee, Kumi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/229,987

(22) Filed: Jan. 14, 1999

(30) Foreign Application Priority Data

Jan. 15, 1998 (KR) ............................................. 98-1035

(51) Int. Cl.⁷ ............................. G11B 5/03; G11B 5/09; G11B 27/36
(52) U.S. Cl. ............................. 360/66; 360/31; 360/53
(58) Field of Search ............................. 360/66, 67, 46, 360/53, 25, 31

(56) References Cited

U.S. PATENT DOCUMENTS

| | | | |
|---|---|---|---|
| 4,935,825 A | * 6/1990 | Worrell et al. | 360/54 |
| 5,784,296 A | * 7/1998 | Baker et al. | 360/53 |
| 5,790,334 A | 8/1998 | Cunningham | 360/66 |
| 5,828,528 A | 10/1998 | Tolman et al. | 360/113 |
| 5,831,782 A | 11/1998 | Kohno et al. | 360/66 |
| 5,856,891 A | 1/1999 | Ngo | 360/66 |
| 6,067,200 A | * 5/2000 | Ohba et al. | 360/66 |

* cited by examiner

Primary Examiner—Regina N. Holder
(74) Attorney, Agent, or Firm—Robert E. Bushnell, Esq.

(57) ABSTRACT

A method for setting a read bias current required for reading data written to a hard disk at an optimal bias current using a magneto-resistive (MR) head. The method for setting a read bias current includes the steps of: writing data to the hard disk in a predetermined frequency; reading data from the disk while varying a bias current value applied to the MR head; analyzing frequency characteristics of the read data; and selecting the bias current at which the read data has the best frequency characteristics, as the bias current of the MR head. In the method, the optimal read bias current is set within a short time through a fast Fourier transform (FFT), thereby reducing the processing time.

22 Claims, 3 Drawing Sheets

METHOD FOR OPTIMIZING THE READ BIAS CURRENT OF A MAGNETO RESISTIVE HEAD

CLAIM OF PRIORITY

This application makes reference to, incorporates the same herein, and claims all benefits accruing under 35 U.S.C. §119 from an application for Method For Setting Read Bias Current of Magneto-Resistive Head earlier filed in the Korean Industrial Property Office on Jan. 15, 1998 and there duly assigned Ser. No. 49735/1998.

FIELD OF THE INVENTION

The present invention relates to a hard disk driving method, and more particularly, to a method for setting a read bias current to the optimal bias current in order to read data written on a hard disk using a magneto-resistive (MR) head.

DESCRIPTION OF THE RELATED ART

In a conventional inductive head, coils are wound around a head core and magnetic flux changes in a disk induces a voltage across the bead coil. In the inductive head, inductance of the head coil should be down as a frequency of a data signal becomes high, in order to stabilize the data signal. When the inductance of the head coil becomes high, the induced voltage of the head is decreased, thereby making it unstable to detect the data signal.

An MR head by which the problem may be solved includes an MR sensor for easily detecting changes in magnetic flux to stably detect even a high-frequency data signal. Unlike the conventional inductive head in which the magnetic flux changes induces the voltage by the head coil, the MR sensor detects the changes in the magnetic flux as changes in resistance while reading of data, and the conventional inductive head structure is adopted while writing of data, so that a signal-to-noise (S/N) ratio may be improved.

In order to operate a hard disk in the optimal condition, various parameters relating to the hard disk should be maintained at the optimum state. Among those parameters, a read bias current which is the current applied to a head to read data written on the hard disk should be optimized such that the head can read data without error. In particular, the MR head has a recording density higher than in a coil type head. Thus, if the read bias current is optimized, the MR head can be read more data without error than the coil head. In order to set the read bias current using the MR head, first the MR head moves onto tracks without any defects and then data is written to the tracks. After writing data, the MR head applies a stress to the tracks, and the data is read from the tracks to thereby determine the current causing the lowest error rate as the read bias current.

However, in the aforementioned method, the optimum value of the read bias current is determined depending on the erroneous state. Thus, multiple reading processes are required, thereby consuming much time.

U.S. Pat. No. 5,790,334 to Cunningham for a Circuit and Method For Optimizing Bias Supply in a Magnetoresistive Head Based on the Thermal Properties of the MR Head Itself discloses a testing circuit and method for optimizing the read bias current in an MR head which includes the steps of varying the bias current applied to the head. However, Cunningham uses a complicated circuit to accomplish the task. In addition, the frequency components of the read data are not analyzed in Cunningham to determine the optimum read bias current.

SUMMARY OF THE INVENTION

To solve the above problem, it is an object of the present invention to provide a method for setting a read bias current, which is for reading data written to a hard disk with the optimal bias current using a magneto-resistive (MR) head.

It is further an object to provide a method for determining the optimum read bias current for an MR head that requires little or no circuitry.

It is still yet another object of the present invention to determine the optimum read bias current by analyzing the frequency spectrum of read data.

Accordingly, to achieve the above first object, there is provided a method for setting a read bias current for reading data written to a hard disk using a magneto-resistive (MR) head, the method comprising the steps of: (a) writing data to the hard disk in a predetermined frequency; (b) reading data from the disk while varying a bias current value applied to the MR head; © analyzing frequency characteristics of the data read in the step (b); and (d) selecting the bias current at which the read data has the best frequency characteristics, as the bias current of the MR head.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF THE INVENTION

Figure 1:
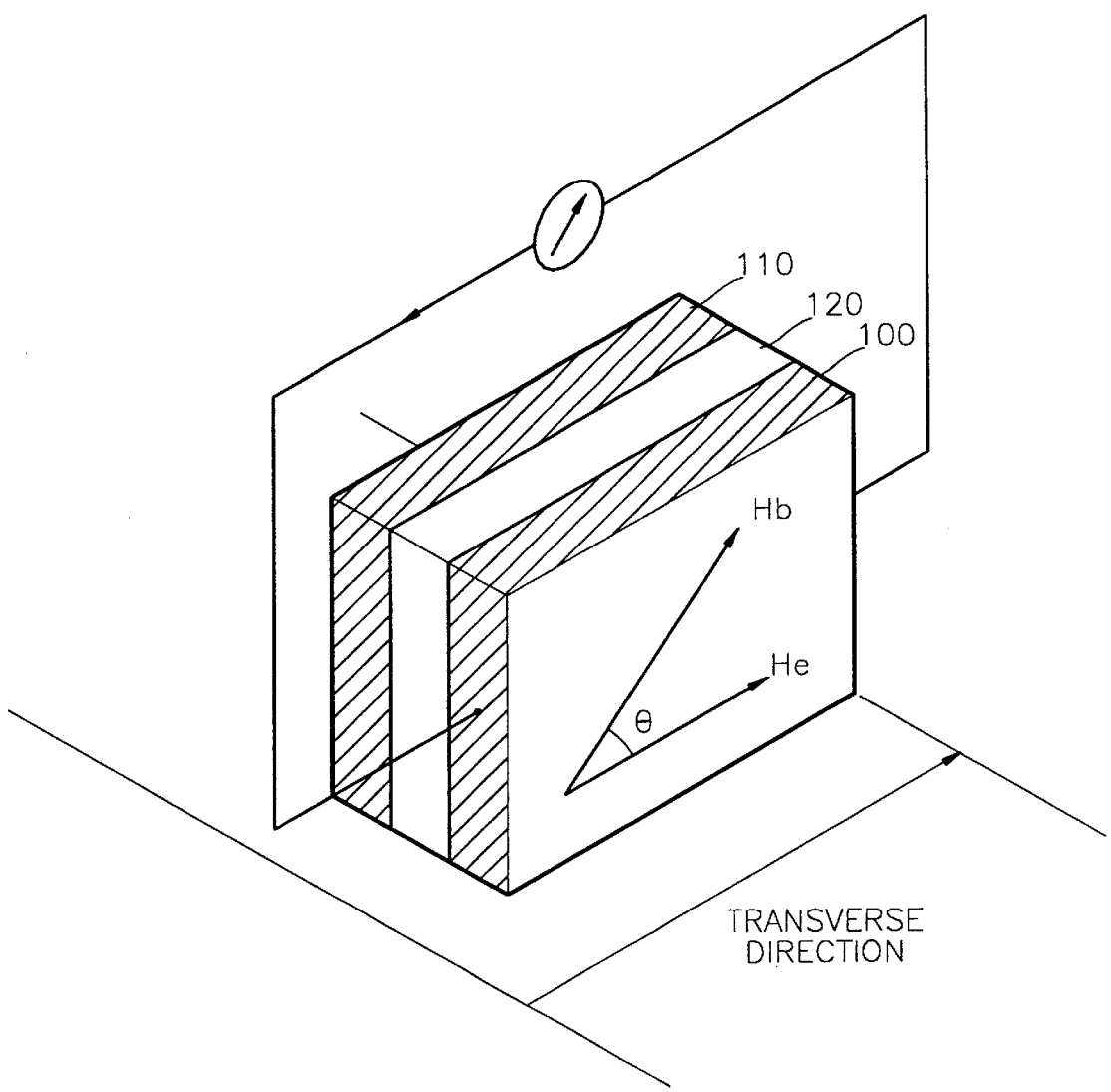
FIG. 1 is a diagram showing the structure of a magneto-resistive (MR) head relating to the present invention.

In FIG. 1, which shows the structure of an MR head relating to the present invention, an MR element 100 is separated from a soft adjacent layer (SAL) 110 by a spacer 120. The MR element 100 is arranged parallel to a transverse direction of the track.

Also, in order to prevent non-linearity of the MR element 100, a bias magnetic flux is applied through the SAL 110 at an angle θ with respect to a bias magnetic flux of the easy direction $H_e$. Here, the angle θ is controlled depending on the thickness of the SAL 110.

Resistance of the MR element 100 is modulated by the magnetic flux of a medium. Here, the easy direction of the MR element 100 refers to the direction along which resistance decreases as the magnetic flux changes.

It is assumed that a current flowing through the MR element 100 is I, an output voltage of the MR element 100 is equal to the product of the current I and the change in resistance ΔR according to Ohm's law, as represented by the following equation.

$$\Delta V = I \cdot \Delta R$$

Figure 3:
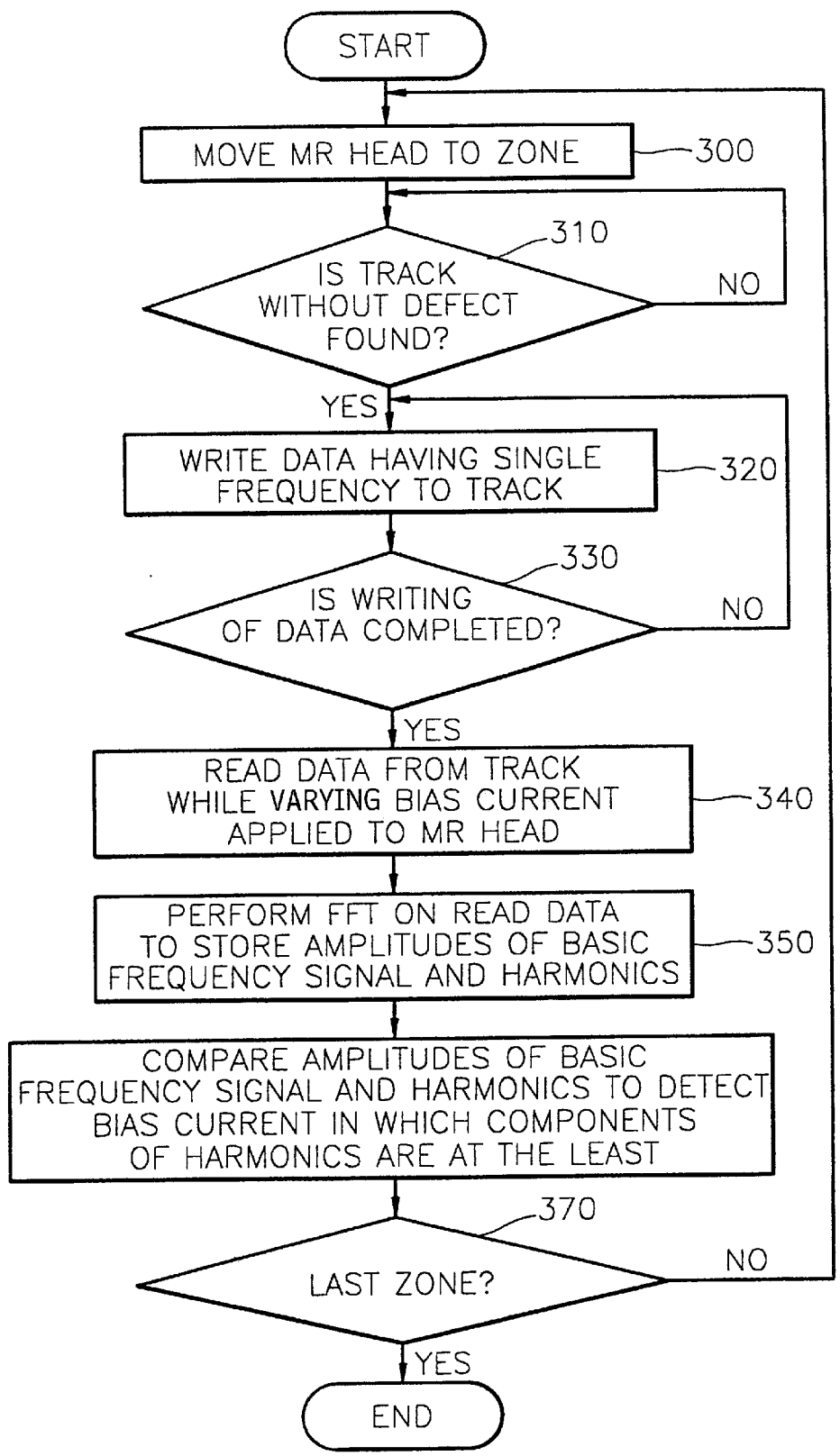
FIG. 3 is a flowchart illustrating a method for setting a read bias current according to the present invention.

Referring to FIG. 3, a method for setting a read bias current according to the present invention includes the steps of: moving a magneto-resistive (MR) head to a zone which serves for setting a read bias current (step 300); determining whether or not a track without defect is found (step 310); writing data having a single frequency to the track (step 320); determining whether or not the writing of data is completed (step 330); reading data from the track while varying the bias current value applied to the MR head (step 340); performing fast Fourier transform (FFT) on the data read from the track to store amplitudes of the basic frequency signal and harmonics generated (step 350); comparing the stored amplitudes of the basic frequency signal and harmonics to detect a bias current value in which components of the harmonics are the least (step 360); and determining whether or not the current zone is the last (step 370).

The present invention will be described in detail with reference to FIGS. 2A to 2C and FIG. 3.

Figure 2A:
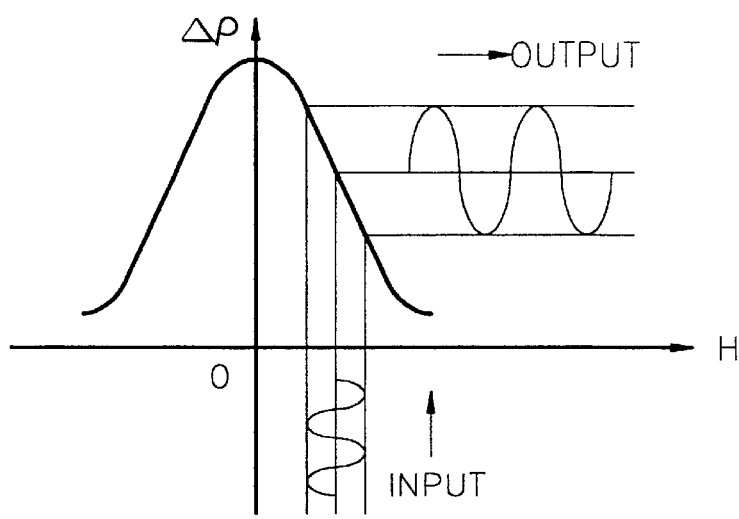
FIGS. 2A through 2C are graphs showing the bias current according to shift of operating point.

When a magnetic field is applied to an MR head, resistance of the MR head changes. That is, resistance varies according to the magnetic flux changes. When the magnetic flux changes, resistance of the MR head varies, so that a read bias current is also changed. FIG. 2A shows the operating point for setting an ideal read bias, in which the horizontal axis represents magnetic flux and the vertical axis represents resistance. In order to set a read bias current, the MR head writes data to a faultless hard disk track as a single frequency, and the current showing the least distortion during the read of data from the track is set as a read bias current. If the resistance changes linearly and the direction of the magnetic flux is the same as the easy direction while setting the read bias voltage, distortion does not occur when the MR head reads the data.

Figure 2B:
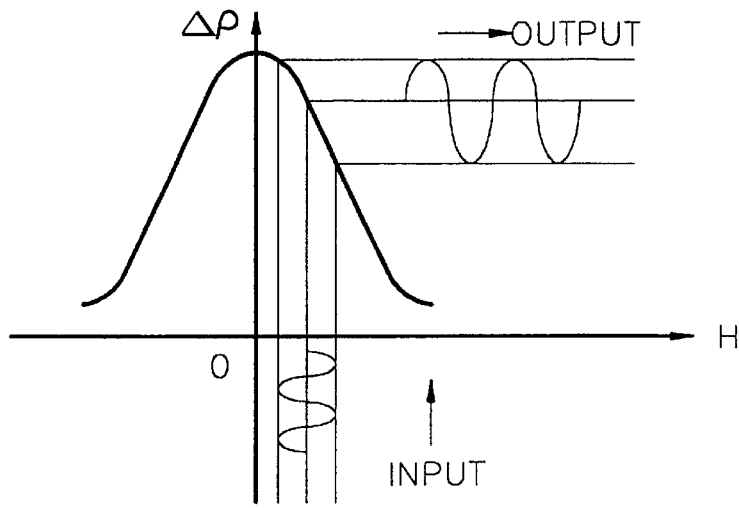
Figure 2C:
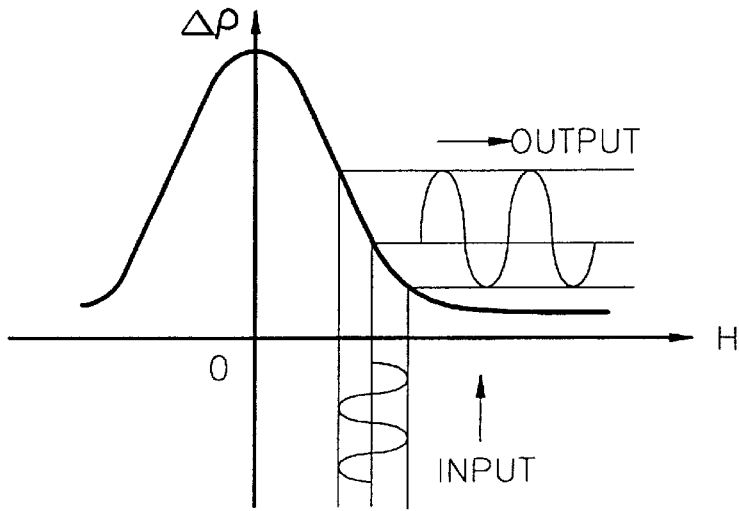

FIG. 2A shows the case in that a read bias current is set for the operating point to be positioned at the center of the linear region, where distortion of the output signal does not occur. However, if the operating point is out of the upper or lower limit of the linear region as shown in FIG. 2B and 2C, the output signal is distorted. That is, when the data having a single frequency input (written) to the track of the hard disk is read, FIG. 2A shows that the single frequency signal is output without distortion, but FIGS. 2B and 2C show the output of a distorted signal. Thus, in order to minimize distortion of the output signal according to an input bias current, the optimal read bias current is set by the following method.

The MR head moves onto a zone which serves for setting a read bias current (step 300). Then, a determination of whether or not a track without defect is found in the zone onto which the MR head has moved (step 310). Such defect can be detected, by writing data to the hard disk and then reading the data from the hard disk. That is, when the data written to the hard disk and the data read by the MR head are the same, it is determined that there is no defect. Meanwhile, when the data written to the hard disk is different from the data read by the MR head, it is determined that a track with defect exists in the zone.

When a track without defect is found in the zone onto which the MR head has moved, data in a single frequency is written to the track (step 320). Then, a determination of whether or not the writing of the data in a single frequency to the track is completed (step 330). If the writing of the data is not completed, the writing of data continues.

When the writing of data in a single frequency to the tracks is completed, the MR head reads data from the tracks while varying the bias current value (step 340). The reason why the bias current is varied to read data written to the tracks is for searching a bias current capable of minimizing distortion of frequency in the corresponding track.

The signal read from the track goes through a FFT, and amplitudes of the resultant basic frequency signal and harmonics are stored in a memory (not shown) (step 350). Here, the FFT is for identifying frequency characteristics, i.e., the degree of distortion, of the signal read. When the FFT starts, the basic frequency and harmonics having frequencies which correspond to an integer multiple of the basic frequency are generated, and amplitudes thereof are stored in the memory.

The amplitude of the basic frequency signal is compared with those of the plurality of harmonics to detect a read bias current at which the components of the harmonics are the least. Here, normalized amplitudes of the basic frequency signal and the harmonics are compared, to set the current at which the harmonics are the least as a read bias current. The read bias current value at which the harmonics are the lowest causes the least distortion when the single frequency data written to the track is read.

After setting the read bias current, it is determined whether or not the current zone is the last (step 370). If the current zone is not the last one, the MR head moves onto another zone which serves for setting a read bias current. Meanwhile, if the current zone is the last one, the setting the read bias current is completed to read data from the disk using the set read bias current. Through the aforementioned procedure, the read bias current which minimizes distortion of the signal can be set in every zone.

As described above, the optimal read bias current is set within a short time through a FFT, thereby shortening the process time.

What is claimed is:

1. In a method for optimizing a read bias current for reading data written to a hard disk using a magneto-resistive (MR) head, the method comprising the steps of:
    (a) writing data to the hard disk in a predetermined frequency;
    (b) reading data from the disk while varying a bias current value applied to the MR head, to provide read data; and
    (c) selecting a bias current at which the read data has best characteristics, as the bias current of the MR head;
the improvement comprising: a selection step for selecting the bias current of the MR head based on optimum frequency characteristics of read data.

2. The method of claim 1, wherein the selection step comprises the substeps of:
    (1) performing a Fast Fourier Transform (FFT) to analyze frequency characteristics of the read data;
    (2) selecting as the bias current of the MR head the bias current at which the read data had the best frequency characteristics as analyzed in substep (1).

3. The method of claim 2, further comprising a step for storing components of a basic frequency and harmonics generated through the FFT.

4. The method of claim 2, wherein in the selection step amplitudes of a basic frequency signal and harmonics are compared to define data having the least components of the harmonics as the read data having the best frequency characteristics.

5. A method for determining an optimum read bias current from a magnetoresistive head to a disk, said method comprising the steps of:
    (1) moving the magnetoresistive head to a particular zone of the disk;
    (2) determining whether a track in said zone is without a defect;
    (3) writing data using a single frequency to said track in said zone if said zone is free of defects;
    (4) reading data from said track while varying a bias current applied to said magnetoresistive head to provide read data; and (5) performing a spectral analysis on the read data to determine a bias current such that it is optimum for reading said magnetoresistive head.

6. The method of claim 5, wherein said spectral analysis includes performing a Fast Fourier Transform (FFT) on said read data to ascertain the spectral components of said read data.

7. The method of claim 6, wherein said spectral analysis includes comparing amplitudes of basic frequency signal and harmonics and selecting a bias current in which the components of the harmonics are at a minimum.

8. The method of claim 7, wherein the entire process is repeated for a new zone.

9. A method for determining the optimum read bias current from a magnetoresistive head to a hard disk, said method comprising the steps of:

(1) moving the magnetoresistive head to a particular zone of a track in the disk;

(2) writing data using a single frequency to said track in said zone of the disk;

(3) reading data from said track while varying a bias current applied to said magnetoresistive head to provide read data; and (4) performing a spectral analysis on the read data to determine a bias current such that it is optimum for reading said magnetoresistive head.

10. The method of claim 9, wherein said spectral analysis includes performing a fast Fourier Transform on said read data to achieve the spectral components of said read data.

11. The method of claim 10, wherein said spectral analysis includes comparing amplitudes of basic frequency signal and harmonics and selecting a bias current in which the components of the harmonics are the least.

12. The method of claim 11, wherein the entire process is repeated for a new zone.

13. The method of claim 12, further comprising checking to see whether a particular zone is free of defects before writing to said zone.

14. In a hard disk drive comprising a disk having tracks, a magnetoresistive head (MRH) for reading data from the tracks of the disk, and means for varying a bias current applied to said MRH, the improvement comprising:

a first means for analyzing frequency characteristics of data read from the tracks of the disk as the bias current is varied; and a second means for selecting as bias current for the MRH a bias current such that it has optimal frequency characteristics as analyzed by the first means.

15. The drive of claim 14, wherein the first means is a means for performing a First Fourier Transform (FFT) analysis on the data, and the second means comprises a means for comparing amplitudes of basic frequency signal and harmonics, and for selecting a bias current in which harmonic components are at a minimum.

16. A method for determining an optimum read bias current from a magnetoresistive head to a disk, said method comprising the steps of:

moving the magnetoresistive head to a particular zone of the disk;

determining whether a track in said zone is without a defect;

writing data using a single frequency to said track in said zone if said zone is free of defects;

reading data from said track while varying a bias current applied to said magnetoresistive head to provide read data; and performing a spectral analysis on the read data to determine a bias current such that it is optimum for reading said magnetoresistive head, wherein said spectral analysis includes comparing amplitudes of basic frequency signal and harmonics and selecting a bias current in which the components of the harmonics are at a minimum.

17. The method of claim 16, wherein said spectral analysis includes performing a Fast Fourier Transform (FFT) on said read data to ascertain the spectral components of said read data.

18. The method of claim 17, wherein the entire process is repeated for a new zone.

19. A method for determining the optimum read bias current from a magnetoresistive head to a hard disk, said method comprising the steps of:

moving the magnetoresistive head to a particular zone of a track in the disk;

writing data using a single frequency to said track in said zone of the disk;

reading data from said track while varying a bias current applied to said magnetoresistive head to provide read data; and performing a spectral analysis on the read data to determine a bias current such that it is optimum for reading said magnetoresistive head, wherein said spectral analysis includes performing a fast Fourier Transform on said read data to achieve the spectral components of said read data.

20. The method of claim 19, wherein said spectral analysis includes comparing amplitudes of basic frequency signal and harmonics and selecting a bias current in which the components of the harmonics are the least.

21. The method of claim 20, wherein the entire process is repeated for a new zone.

22. The method of claim 21, further comprising checking to see whether a particular zone is free of defects before writing to said zone.

* * * * *